G. HOTCHKISS.
Mill Spindle Step.
No. 21,199.
Patented Aug. 17, 1858.
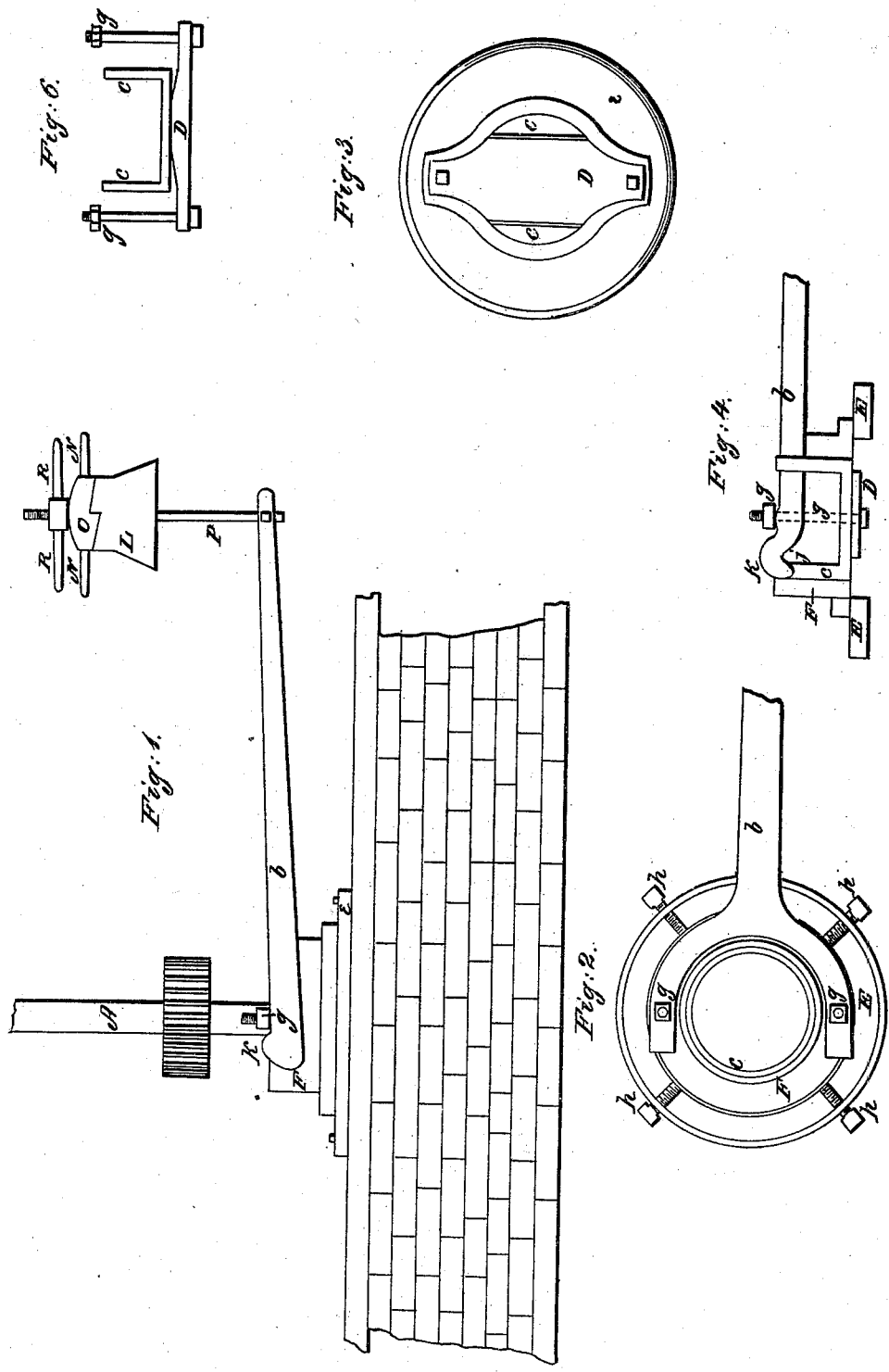

UNITED STATES PATENT OFFICE.

GIDEON HOTCHKISS, OF WINDSOR, NEW YORK.

MODE OF SECURING AND ADJUSTING THE STEPS OF MILL-SPINDLES.

Specification of Letters Patent No. 21,199, dated August 17, 1858.

*To all whom it may concern:*

Be it known that I, GIDEON HOTCHKISS, of Windsor, in the county of Broome and State of New York, have invented a new and useful Improvement in the Construction of Counter-Bridges and Tram-Blocks for Grist and Flour Mills, patented to the aforesaid GIDEON HOTCHKISS June 29, 1852, by the United States Patent Office; and I do hereby declare that the following is a full and exact description thereof, reference being had to the accompanying drawings and letters of reference marked thereon.

Figure 1 represents tramblock in place on a stone or brick husk with the safety lightener in place; Fig. 2 is a top view of tramblock with lever in place; Fig. 3 is a bottom view; Fig. 4 a sectional view; Fig. 5 represents the safety lightener in place; Fig. 6 a representation of sway bar and bolts and oil pot.

A Fig. 1 a view of a section of the spindle and pinion resting on the step, which is fastened in the bottom of the oil cup $e$ $e$, Figs. 2 and 4. Said oil cup like all other parts (except bolts and screws) are made of cast iron, and about five inches in diameter and four inches deep. The shell F Fig. 2 is also four inches deep, with an opening turned or bored out on the inside to fit outside of the pot $c$ which works up and down in the shell as the spindle and stone are adjusted.

The shell F, F, has a flange on the bottom two inches wide and one inch thick and eleven inches in diameter. On each opposite side and central through the flange are mortises to allow the sway bolts $g'$, $g'$, Figs. 2 and 4, to pass freely through the said shell. $j$ Fig. 4. These are two raised fulcrums extending from the flange upward to within half an inch of the top of the shell of sufficient proportions to receive the V grooves at $j$ Fig. 4, on the under side of the lever $b$. Said lever is three feet ten inches long and two inches deep and tapers from one inch and a half at the end to two inches and a half at the forked ends which fit astride the shell F on the fulcrum $j$ Fig. 4 with the top side nearly on a level with the top of the shell and pot. In each branch of said lever at $g$ $g$ and central with a line drawn across the pot, and shell are two holes vertically through said lever and two inches from the V grooves $j$. Said holes are made oblong on the under side of the lever so that the sway bolts $g$ $g$ will not bind as the lever $b$ is worked up and down. Said bolts are nine inches long and seven eighths of an inch diameter. Under the nut $g$ Fig. 4 the lever $b$ is made oval to allow it to work and not pry on the nut.

The lever at $k$ is raised so that the V groove for the fulcrums on the shell and the top of the lever at $g$ shall be nearly on a horizontal line.

The base $e$ Fig. 3 is cut out to allow the sway bar D, to move in either direction (horizontally) within said base, as far as the spindle requires to move from time to time in traming. The bolts $g$, $g$, pass up from the said sway bar D and being thus suspended from the lever and said lever resting on shell and the pot ($c$ $c$ Figs. 2 and 3) resting on sway bar D. Said pot has two flanges or projections extending half an inch below the bottom $c$ $c$ forming a seat corresponding with the width of the sway bar D on which the pot rests to prevent it from turning around from the motion of the spindle.

The sway bar D, is five inches wide where the pot rests upon it and one and a half inch thick having its upper surface rounded in a circular form, D, Fig. 6, to allow the nuts $g$ $g$ Figs. 2 and 6 to be turned up unequally without canting or cramping the pot in the shell.

Fig. 5—safety lightener standing over or under the long end of the lever connected by a rod three fourths of an inch in diameter and of sufficient length to attach with the lightener where the miller can reach it, with a screw or thread of sufficient length to equal the desired movement of the lever at P. L, Fig. 5, base of the lightener four inches in diameter at the bottom with a flange half an inch in width with holes to fasten to floor near the stone curb. It is conical three inches high and two and a half inches at the top with two spiral inclined planes one inch high extending half around. The adjustable part of safety lightener O, Fig. 5, is a cylinder four inches long and two and a half inches in diameter at the lower end, which is fitted to the inside of the base. The top is three and a half inches in diameter with spiral inclined plane to correspond with those on the top of the base and a hole through the center for the lightener screw to pass through; N N handles of safety lightener by which a half turn being given raises the end of the lever one inch; R Fig. 5 handles or wheel on screw of lightener rod P which when turned moves the lever $b$ up and down while the part N stands still.

The safety lightener is only used when starting the mill or to raise the stone suddenly when clogged or some hard substance is between them.

Having thus described my improved tramblock with safety lightener what I claim as my invention and desire to secure by Letters Patent is—

1. The double fulcrum lever operating outside of the shell and over the base resting on two raised fulcra on the shell fitted to said levers and the suspending the sway bar and pot by means of sway bolts passing through said lever in the manner described—also the flanges C, C on the bottom of the pot.

2. I also claim the manner of supporting the regulating screw on an adjustable base or safety lightener by which the stone can be quickly raised and returned again to the same position substantially as herein described, in combination with the foregoing arrangement.

GIDEON HOTCHKISS.

Witnesses:
　ADDISON McKEE,
　RODNEY LUMSEY.